Aug. 25, 1953     C. V. GREEN     2,650,182
METHOD OF FORMING WATERPROOF GARMENTS
Filed June 14, 1951
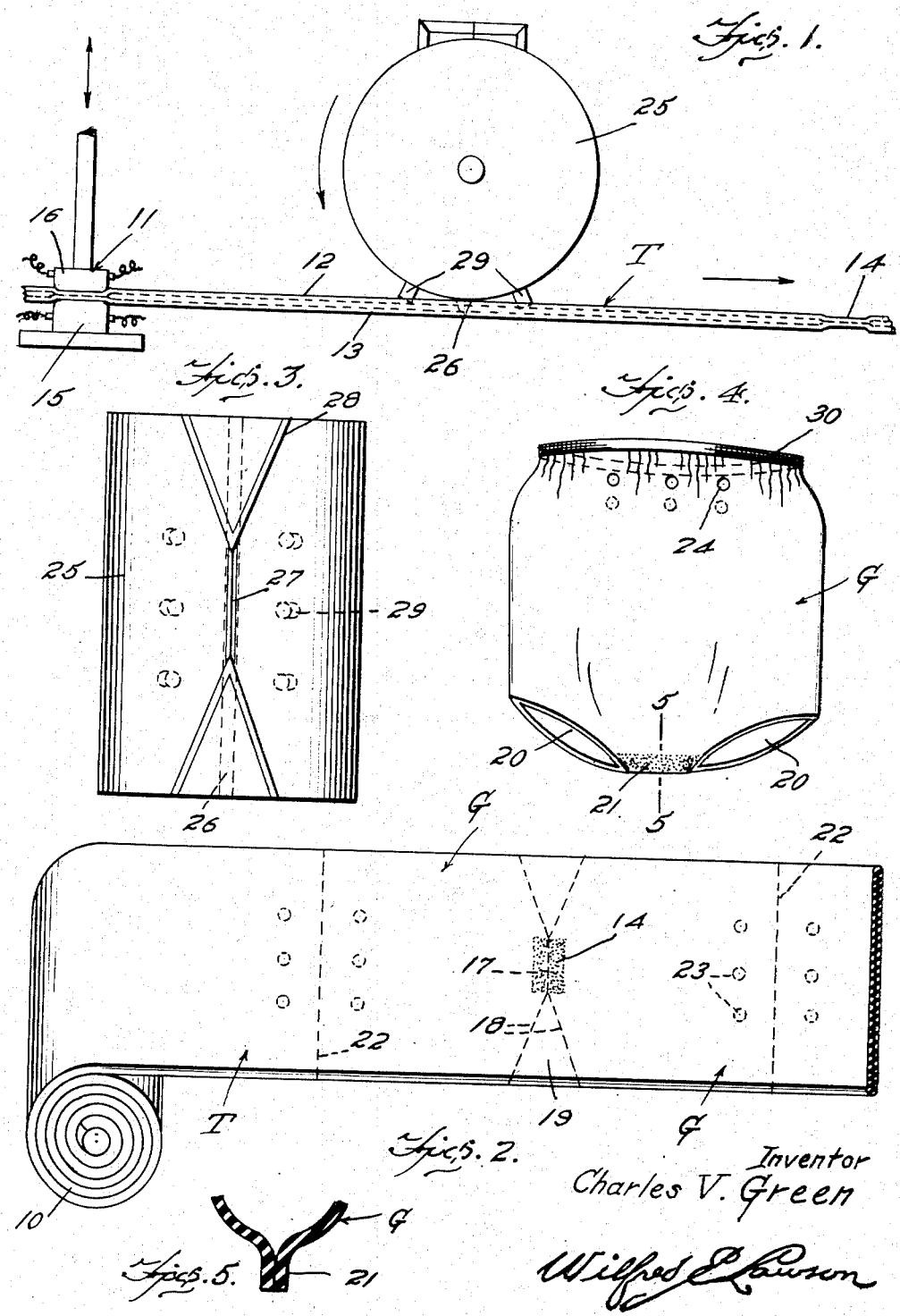
Inventor
Charles V. Green Patented Aug. 25, 1953

2,650,182

UNITED STATES PATENT OFFICE 2,650,182

METHOD OF FORMING WATERPROOF GARMENTS

Charles V. Green, Pasadena, Calif.

Application June 14, 1951, Serial No. 231,578

3 Claims. (Cl. 154—125)

This invention relates to the manufacture of waterproof garments and is directed particularly to improvements in waterproof baby panties.

The principal object of the present invention is to provide an improved method of manufacturing waterproof baby panties through a continuous operation employing a seamless tubular stock material of rubber, either natural or synthetic, whereby such articles may be more economically produced than is possible according to the present methods employed.

A further object of the invention is to provide an improved method of manufacturing waterproof baby panties from a continuous tube of rubber material wherein such tube is compressed at spaced points longitudinally thereof to seal the front and rear portions together and subsequently cut transversely through the central sealed area and at opposite sides thereof to simultaneously produce two complete garments.

A still further object of the invention is to provide a method of making waterproof panties of the character stated wherein the sealing operation and the cutting operation are carried out alternately and continuously along the length of a tube of material of selected width whereby the operation of producing the panties proceeds uninterruptedly.

Still another object of the invention is to provide an improved method of the above stated character wherein the transverse cutting of the tube is effected through the central sealed area and in wedge form at each side of such sealed area whereby to produce simultaneously the crotch and leg opening of two pairs of garments.

The invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawing:

Figure 1 illustrates diagrammatically one possible means of carrying out the present method, showing a rotary cutting unit and heat sealing means operating upon a flattened tube of material.

Figure 2 is a view in perspective of a roll of flattened tubular material with an end portion drawn off and showing a seal spot and transverse cut lines with locations of ventilation openings.

Figure 3 is a plan view of one side of a rotary cutter such as might be used in carrying out the present invention.

Figure 4 is a view in perspective of a pair of the waterproof panties constructed in accordance with the present invention.

Figure 5 is a detailed section taken substantially on the line 5—5 of Figure 4.

Referring now more particularly to the drawing, the present method is carried out by providing a suitable length of seamless polyethylene tubing or tubing of natural rubber, which is generally designated T and which, if any considerable length, may be provided in a roll 10 from which the tube may be taken off over a suitable working surface, not shown, such as a table or the like.

In carrying out the present method the tubing is moved, in flat condition as shown in Figure 1, between suitable heater elements such as are generally designated 11, which elements may be brought together at spaced periods to press the top and bottom parts 12 and 13 of the tubing together to effect the sealing of such parts in an area of specified size or width as indicated at 14.

The heat sealing unit 11 is here shown as comprising a bottom stationary mandrel 15 and a top die 16 which may be moved down against the mandrel so as to compress the two parts of the tube together.

As shown in Figure 2, the sealed area 14 may be of rectangular outline with the long sides extending transversely of the tube and spaced centrally between the longitudinal edges of the tube. This sealed area 14 provides the crotch portion for two pairs of panties, when the tubing is cut along the single transversely extending line 17 which passes midway between the sides of the area 14 as shown.

At each side of the central sealed area 14 the material of the tubing is cut out along the inwardly converging lines 18 which join at an end of the single cut line 17, thereby removing a triangular or wedge shaped portion 19 of the material. The removal of these wedge shaped pieces 19 from opposite sides of the tube forms the leg openings 20 for each of two garments as shown in Figure 4, where the completed garment is generally designated G. Each of such completed garments also comprises one half of the sealed area 14 thus forming the crotch portion 21 for the garment.

At the proper distance upon each side of the transverse line 17 a complete straight transverse cut is made through the tubing on line 22, thus producing two garments as illustrated.

Simultaneously with the formation of the cuts along the lines 22 the tubing may be punched through both sides with a desired number of openings, in the spaces designated 23 thereby to provide the ventilation openings shown in the completed garment in Figure 4 and designated 24.

While any suitable means may be employed for cutting the tubing along the lines 17, 18 and 22 and for forming the openings 24 at the positions indicated by the reference numeral 23 in Figure 2, one means of cutting and punching the tubing after the successive seal spots 14 have been formed is shown in Figure 1 in the form of a rotary drum or cylinder 25, which may be supported to rotate on an axis extending transversely of and located above the tubing, while the tubing is supported in a suitable manner, as for example, upon a cutting board or the like, not shown. This cylinder is provided with a single straight blade 26 extending lengthwise of the periphery of the drum while diametrically opposite from the blade 26 the drum carries a short centrally positioned single straight blade 27 which at each end merges with the joined ends of the two inwardly converging blades 28 which form a V and which function to cut out the triangular pieces 19.

At each side of the straight blade 26 the drum may carry a suitable number of punches 29 by means of which the ventilation holes 24 are formed.

It will, of course, be understood that for forming garments of different sizes, that is to fit children of different ages the width of the tubular material will be varied and also the size or the width of the seal spot 14 will be increased or decreased where it is necessary to form larger or smaller leg openings. For example, if a garment is to be produced for a child of one and a half years having approximately a twenty inch waist a tubing of twelve inch width will be used. Such tubing will give a waist opening size or circumference of twenty-four inches thus allowing a four inch tolerance. Also for a garment of this size the length of the garment would be about nine and one half inches in height or length, where the child measures about six and one quarter inches from the crotch to the waist and for a thigh of eleven inches circumference, the leg aperture will be about five inches in diameter.

After the garment is formed the top edge or waist may be finished off by having applied thereto an elastic ruffle band 30 formed of suitable thin rubber material and, if desired, the edges of the leg openings 20 may be suitably reinforced although this is not considered necessary.

It will be readily seen from the foregoing that all operations in connection with the formation of a garment of this kind, with the possible exception of the addition of the elastic ruffle band 30 around the waist, may be performed continuously and automatically and will result in the production of a garment of utility and quality equal to most hand made garments.

Because of the novel manner of carrying out the method it will be readily appreciated that the cost of production will be materially less than in those cases where the garments are formed by hand from individual pieces of material and consequently such a garment may be more economically sold.

I claim:

1. The method of forming a garment of the character stated, which method comprises providing a length of thermoplastic material in tubular form, flattening the tube and spot sealing opposite sides of the tube together at spaced intervals longitudinally of the tube, and then dividing the tube transversely through each seal spot and on lines lying midway between the seal spots.

2. The method of forming a waterproof garment as set forth in claim 1, with the step of making the divisions from each side of the seal spot to the adjacent side edge of the flattened tube along two inwardly converging lines to remove a V-shaped section of the tube whereby to produce leg openings in which the edges extend oblique to the length of the garment.

3. The method of forming a garment of the character stated which comprises providing a length of tubular thermoplastic material, flattening the tubular material and sealing the top and bottom sections of the tube together in relatively small spot areas disposed along the longitudinal center of the flattened tube midway between the longitudinal edges thereof, then transversely dividing the tube along a single line passing only through each spot seal and along outwardly divergent lines extending from each end of said single line to the edges of the flattened tube, and finally transversely dividing the tube along a line disposed midway between two spot seals, the two division steps being continuously and alternately performed.

CHARLES V. GREEN.

References Cited in the file of this patent

UNITED STATES PATENTS

| Number | Name | Date |
| --- | --- | --- |
| 2,241,812 | Gowdy | May 13, 1941 |
| 2,444,685 | Waters | July 6, 1948 |